United States Patent
Hong et al.

(10) Patent No.: US 12,554,049 B2
(45) Date of Patent: Feb. 17, 2026

(54) THIN OPTICAL SYSTEM FOR REAL-WORLD OCCLUSION IN AUGMENTED REALITY DISPLAY

(71) Applicant: Korea Electronics Technology Institute, Seongnam-si (KR)

(72) Inventors: Ji Soo Hong, Seoul (KR); Sung Hee Hong, Seoul (KR); Young Min Kim, Seoul (KR); Jin Soo Jeong, Seoul (KR); Yong Hwa Kim, Gunpo-si (KR); Byoung Hyo Lee, Seoul (KR); Hyeon Chan Oh, Seoul (KR)

(73) Assignee: Korea Electronics Technology Institute, Seongnam-si (KR)

( * ) Notice: Subject to any disclaimer, the term of this patent is extended or adjusted under 35 U.S.C. 154(b) by 324 days.

(21) Appl. No.: 18/343,886

(22) Filed: Jun. 29, 2023

(65) Prior Publication Data
US 2024/0393509 A1    Nov. 28, 2024

(30) Foreign Application Priority Data
May 23, 2023 (KR) .......... 10-2023-0066117

(51) Int. Cl.
*G02B 5/124* (2006.01)
*G02B 27/09* (2006.01)

(52) U.S. Cl.
CPC .......... *G02B 5/124* (2013.01); *G02B 27/0955* (2013.01); *G02B 27/0988* (2013.01)

(58) Field of Classification Search
CPC ........ G02B 30/56; G02B 5/124; G02B 5/122; G02B 5/12; G02B 27/0101
See application file for complete search history.

(56) References Cited

U.S. PATENT DOCUMENTS 11,592,685 B2 *    2/2023    Han .......... G02B 3/08

FOREIGN PATENT DOCUMENTS

| JP | 2007-521482 A | 8/2007 | |
| JP | 5252584 B2 | 7/2013 | |
| JP | 2014016563 A * | 1/2014 | |
| KR | 10-2244445 B1 | 4/2021 | |
| KR | 10-2022-0085628 A | 6/2022 | |
| WO | WO-2019087996 A1 * | 5/2019 | .............. H04N 5/64 |

OTHER PUBLICATIONS

Korean Office Action issued on Dec. 9, 2024, in corresponding Korean Patent Application No. 10-2023-0066117. (4pages in English, 6pages in Korean).

* cited by examiner

Primary Examiner — Christopher Stanford
(74) Attorney, Agent, or Firm — NSIP Law

(57) ABSTRACT

There is provided a thin optical system for real-world occlusion in an augmented reality display. The optical system according to an embodiment includes: a first DCRA configured to reflect light beams focused on holes; a mask positioned on a light emitting surface of the first DCRA to pass or block the light beams emitted from the first DCRA; and a second DCRA configured to reflect the light beams which are focused on holes after passing through the mask. Accordingly, the optical system can implement real-world occlusion in the unit of pixel while having a thin form factor.

20 Claims, 5 Drawing Sheets

THIN OPTICAL SYSTEM FOR REAL-WORLD OCCLUSION IN AUGMENTED REALITY DISPLAY

CROSS-REFERENCE TO RELATED APPLICATION(S) AND CLAIM OF PRIORITY

This application is based on and claims priority under 35 U.S.C. § 119 to Korean Patent Application No. 10-2023-0066117, filed on May 23, 2023, in the Korean Intellectual Property Office, the disclosure of which is herein incorporated by reference in its entirety.

BACKGROUND

Field

The disclosure relates to an optical system for an augmented reality display, and more particularly, to an optical system for real-world occlusion in an augmented reality display.

Description of Related Art

A related-art augmented reality display shows an image to a user simply by overlaying image information without applying occlusion for the real world. However, if it is possible to provide occlusion for the real world, it is possible to implement mixed reality that shows blend of the real world and a virtual image in a more natural way, and also, there may be advantages that a large amount of light from the real world is blocked and hence required luminance of the virtual image is reduced.

In order to provide occlusion for a real object positioned at a long distance from a user, an optical system capable of imaging the real object on an occlusion mask may be required, and, to achieve this, a complicated optical system as shown in FIG. 1 may be typically required. Such an optical system may have an advantage of providing occlusion in the unit of pixel (per-pixel), but in general may have a large volume and thus may have a problem that it is difficult to apply to an augmented reality display for which a thin structure is preferred.

FIG. 2 illustrates a method of positioning a flat dynamic mask such as a liquid crystal (LC) mask between a real object and an observer in order to implement occlusion in a thin optical system. This method may have an advantage of making a thickness of the optical system for implementing occlusion relatively thin.

However, in an observer vision system which focuses on real objects positioned at a long distance, respective pixels of the occlusion mask positioned at a short distance may be projected on observer's retina with a blur due to characteristics of the augmented reality display which is typically implemented in the form of near-eye display (NED). Accordingly, in this configuration, an occlusion pattern of the occlusion mask may be blurred and there may be a disadvantage that the real world is not exactly hidden as desired. This method is referred to as soft-edge occlusion since an edge of the occlusion pattern is blurred.

SUMMARY

The disclosure has been developed in order to solve the above-described problems, and an object of the disclosure is to provide an optical system for an augmented reality display, which is capable of implementing real-world occlusion in the unit of pixel while having a thin form factor.

According to an embodiment of the disclosure to achieve the above-described object, an optical system may include: a first dihedral corner reflector array (DCRA) configured to reflect light beams focused on holes; a mask positioned on a light emitting surface of the first DCRA to pass or block the light beams emitted from the first DCRA; and a second DCRA configured to reflect the light beams which are focused on holes after passing through the mask.

According to an embodiment, the optical system may further include first lenses configured to focus incident light beams on the holes of the first DCRA, and the first DCRA may reflect the light beams focused on the holes by the first lenses.

The first lenses may be positioned at positions where the incident light beams enter the holes of the first DCRA in an off-axis orientation, respectively.

The first lenses may have centers positioned at a position apart from an optic axis of the incident light beams.

The mask may block light beams reflected from holes corresponding to positions where occlusion is provided for a real object, while passing light beams reflected from the other holes.

The mask may be an LC mask having pixels corresponding to the holes of the first DCRA.

According to an embodiment, the optical system may further include second lenses which have same center axes as the center axes of the first lenses and are configured to focus light beams emitted from the mask after passing therethrough on the holes of the second DCRA, and the second DCRA may reflect the light beams focused on the holes by the second lenses.

According to an embodiment, the optical system may further include third lenses which have same center axes as the center axes of the first lenses and the second lenses and are positioned on a light emitting surface of the second DCRA to transform the light beams emitted from the second DCRA into light beams parallel to the incident light beams entering the first lenses.

$f_3 = f_1 f_2/(f_1 - f_2)$, where $f_1$ is a focal distance of the first lenses, $f_2$ is a focal distance of the second lenses, and $f_3$ is a focal distance of the third lenses.

According to another aspect of the disclosure, there is provided a real-world occlusion method of an optical system, the method including: reflecting, by a first DCRA, light beams focused on holes; passing or blocking, by a mask positioned on a light emitting surface of the first DCRA, the light beams emitted from the first DCRA; and reflecting, by a second DCRA, the light beams which are focused on holes after passing through the mask.

According to still another aspect of the disclosure, there is provided an optical system including: a first DCRA configured to reflect light beams focused on holes; a mask positioned on a light emitting surface of the first DCRA to pass or block the light beams emitted from the first DCRA; and a second DCRA configured to reflect the light beams which are focused on holes after passing through the mask, wherein the mask is configured to block light beams reflected from holes corresponding to positions where occlusion is provided for a real object, while passing light beams reflected from the other holes.

According to yet aspect of the disclosure, there is provided a real-world occlusion method of an optical system, the method including: reflecting, by a first DCRA, light beams focused on holes; masking, by a mask positioned on a light emitting surface of the first DCRA, to pass or block the light beams emitted from the first DCRA; and reflecting, by a second DCRA, the light beams which are focused on holes after passing through the mask, wherein masking includes blocking light beams reflected from holes corresponding to positions where occlusion is provided for a real object, while passing light beams reflected from the other holes.

According to embodiments of the disclosure as described above, an optical system for an augmented reality display can apply real-world occlusion in the unit of pixel while having a thin form factor by using off-axis lens arrays, a DCRA, and an LC mask.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Hereinafter, the disclosure will be described in more detail with reference to the accompanying drawings.

Embodiments of the disclosure propose a thin optical system for real-world occlusion in an augmented reality display.

Real-world occlusion technology for a related-art augmented reality display provides real-world occlusion in the unit of pixel through an optical system having a large volume. Alternatively, the related-art technology uses an optical system having a thin form factor, but this method does not provide occlusion in the unit of pixel and provides soft-edge occlusion. To solve these problems of the related-art technology, embodiments of the disclosure propose an optical system for an augmented reality display, which is capable of providing occlusion in the unit of pixel while having a thin form factor.

Figure 1:
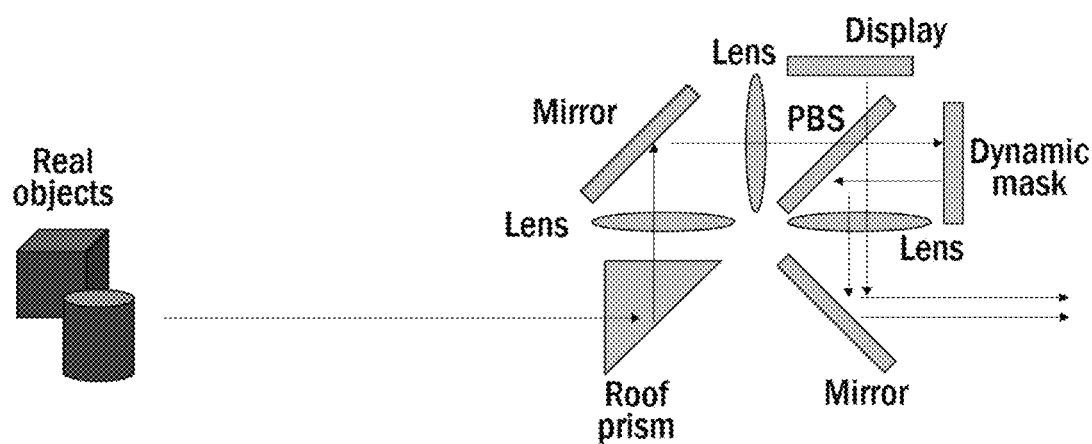
FIG. 1 is a view illustrating an optical system which is capable of providing occlusion in the unit of pixel.
Figure 2:
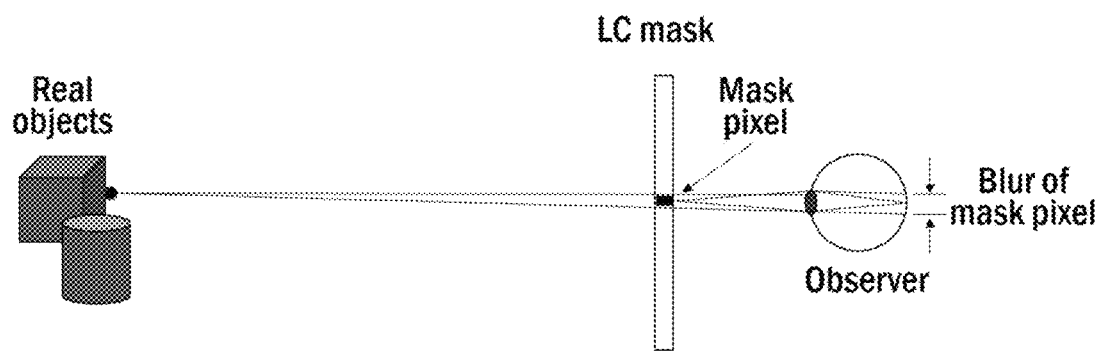
FIG. 2 is a view illustrating an optical system which provides soft-edge occlusion.
Figure 3:
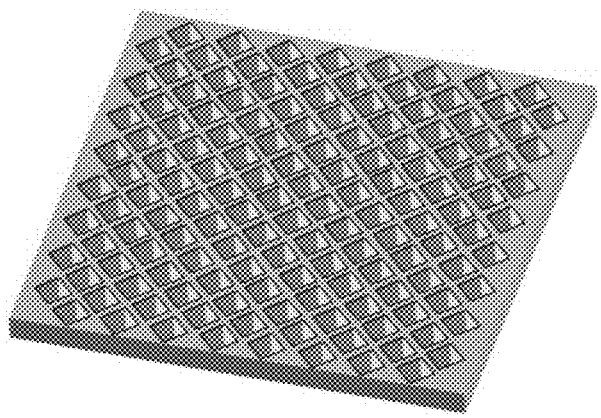
FIG. 3 is a perspective view of a dihedral corner reflector array (DCRA)
Figure 4:
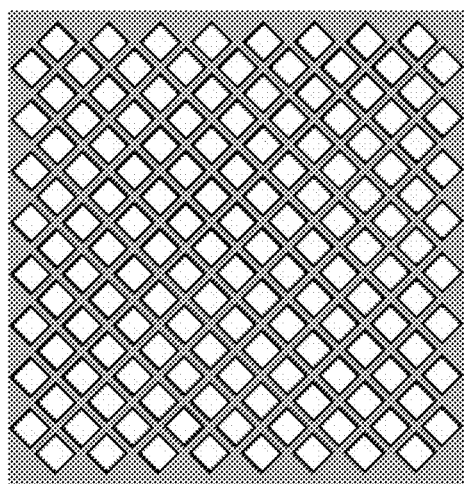
FIG. 4 is a top view of the DCRA.

FIG. 3 is a perspective view of a dihedral corner reflector array (DCRA) to be applied to an optical system for an augmented reality display according to an embodiment of the disclosure, and FIG. 4 is a top view of the DCRA shown in FIG. 3.

Figure 5:
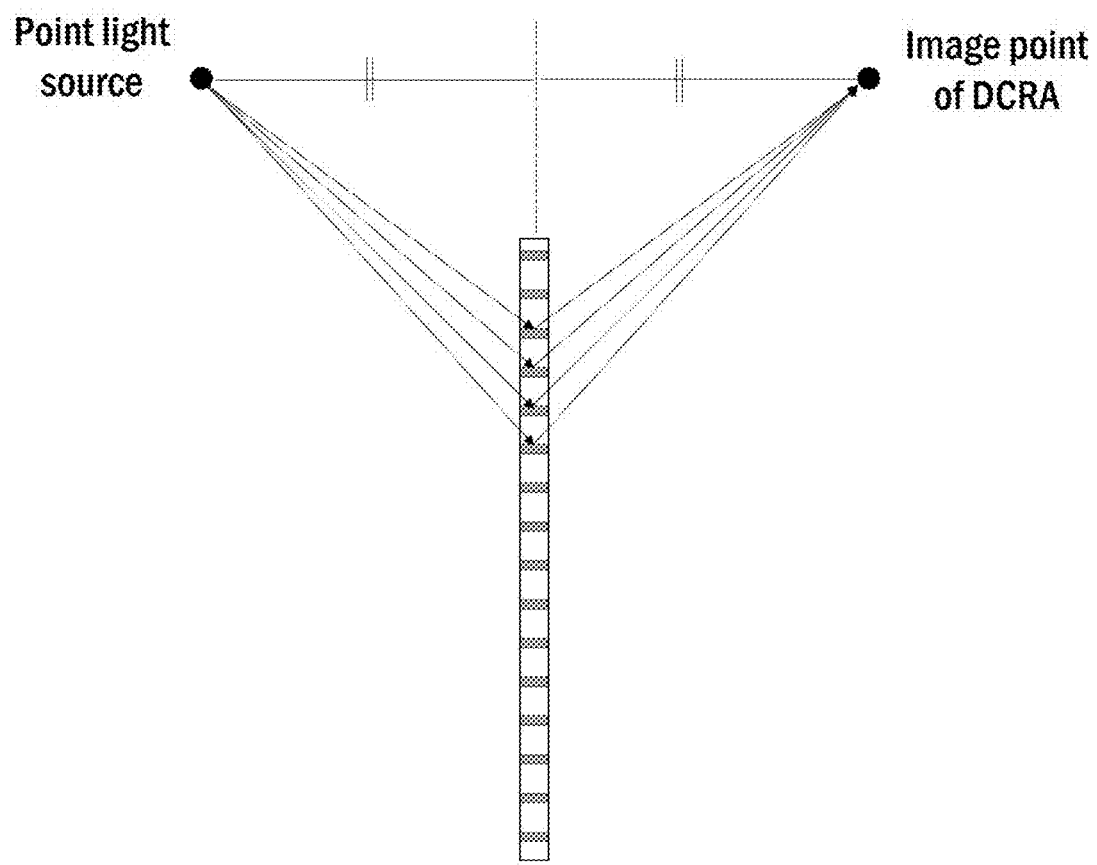
FIG. 5 is a view illustrating a side surface of the DCRA and image characteristics.

As shown in FIGS. 3 and 4, the DCRA has a net-like structure having small rectangular holes, and includes a mirror disposed on a surface of an inner wall of each rectangular hole. Accordingly, the inner surface of the rectangular hole of the DCRA operates as a corner reflector to retro-reflect incident light as shown in FIG. 5. As a result, light beams starting from a point light source positioned at a certain position are collected at a mirror-symmetric position through the DCRA, thereby forming a real image.

In this case, the light beams reflected from the inner surfaces of the DCRA an odd number of times are oriented in an intended direction, whereas the light beams passing through the rectangular holes without being reflected or the light beams reflected an even number of times travel in an unintended direction and act as a noise.

In order to avoid such a noise, incident light should enter in an off-axis orientation at a certain angle as shown in FIG. 5, and an optical system for tilting an incident angle of incident light by refracting, such as a prism, may be disposed before and after the DCRA to utilize the DCRA as an on-axis.

Figure 6:
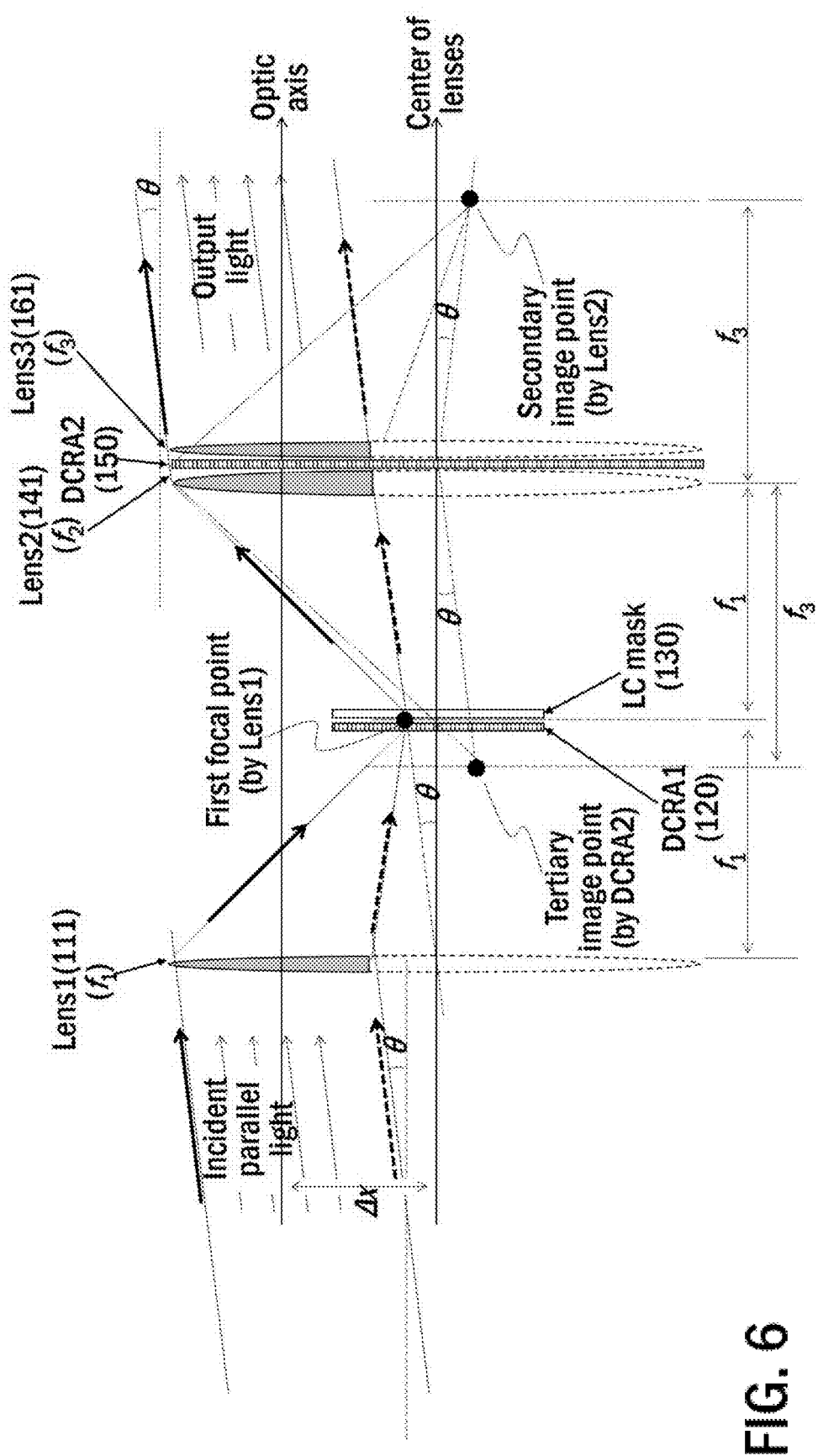
FIG. 6 is a view illustrating a unit optical system for real-world occlusion.

FIG. 6 is a view illustrating a unit optical system for an optical system for an augmented reality display according to an embodiment. The unit optical system enables real-world occlusion in the unit of pixel while it has a thin structure.

The unit optical system according to an embodiment refers to an optical system that focuses incident parallel light entering at a certain angle θ on an LC mask 130 disposed in the middle of the optical system, and determines whether to pass or block the incident light by turning on/off a pixel of a focus position of the LC mask 130, and, when it is determined that light is passed, finally outputs parallel light having an angle θ like the incident light.

In order to perform the above-described function, the unit optical system according to an embodiment may include a lens 1 111, a DCRA 1 120, an LC mask 130, a lens 2 141, a DCRA 2 150, and a lens 3 161.

First, incident light enters the lens 1 111 which has a center at a position apart from an optic axis of the incident light. The lens 1 111 has a focal distance $f_1$ and has a lens center at a position apart from the optic axis of the incident light by $\Delta x$, and focuses on a plane positioned at the focal distance $f_1$ of the lens 1 111.

If the LC mask 130 which is a kind of dynamic mask is placed on this plane, it may be determined whether to pass or block all of the parallel light beams entering at the certain angle by controlling pixels of the LC mask 130. In addition, the DCRA1 120 may be disposed on the incident surface of the LC mask 130, thereby allowing light beams passing through the LC mask 130 to return in an original optic axis direction.

The incident light should enter the DCRA1 120 in an off-axis orientation in order to remove a noise as described above. To achieve this, the center of the lens 1 111 is positioned apart from the optic axis, and paraxial light beams of the incident light entering the lens 1 111 is made to be focused in the proximity of an intersection point between the DCRA 1 120 and the center axis of the lens 111, which is apart from the optic axis by Δx, and eventually, the light beams enter the DCRA 1 120 in an off-axis orientation. Accordingly, when Δx is greater than or equal to an appropriate value, a noise is removed from the paraxial light beams at the DCRA1 120, and the DCRA1 120 operates as intended.

The light that is focused on the plane of the DCRA 1 120 and the LC mask 130 is emitted again. In this case, if the lens 2 141 having the same center axis as the lens 1 111 and having a focal distance $f_2$ is placed at a distance $f_1$, the incident light is focused after passing through the lens 2 141 (secondary image point). In this case, a focal distance may be obtained by a lens expression of $f_1 f_2/(f_1-f_2)$, and the light is oriented toward the center axis of the lenses 111, 141 again.

If the DCRA 2 150 is placed on a light emitting surface of the lens 2 141, the image point may be changed to a tertiary image point which is positioned at a mirror-symmetric position of a light emitting surface of the DCRA 2 150. However, since light entering the DCRA 2 150 still enters in the off-axis orientation, a noise is removed at the DCRA 2 150 and the DCRA 2 150 is usable to perform an intended function.

In this case, the lens 3 161 having the same center axis as the lens 1 111 and the lens 2 141 and having a focal distance $f_3$ is placed on the light emitting surface of the DCRA 2 150. In this case, if $f_3$ is equal to $f_1 f_2/(f_1-f_2)$ which is the focal distance of the secondary image point, light passing through the DCRA 2 15 may be outputted as parallel light having the same angle θ as incident light.

Accordingly, the optical system according to an embodiment may block the entire incident light entering as parallel light having the angle θ if it is determined that light is blocked by controlling a corresponding pixel of the LC mask 140, but, if it is determined that light is passed, the optical system may emit parallel light having the same angle θ as the incident light.

In the optical system according to an embodiment, an expression $2(f_1+d)$ may be established if a thickness of DCRA 1, 2 120, 150 is d.

Figure 7:
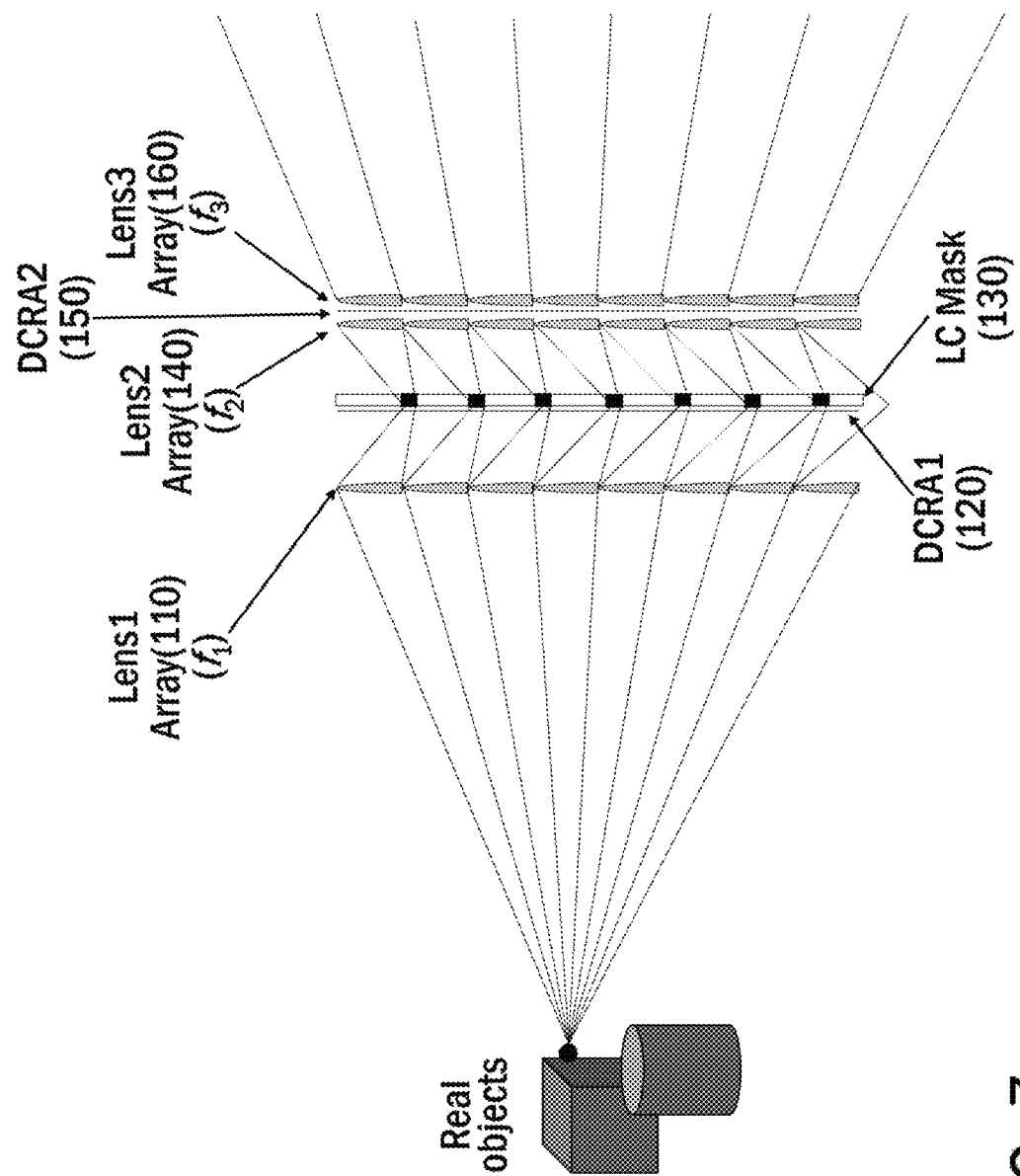
FIG. 7 is a view illustrating an optical system for an augmented reality display for real-world occlusion.

FIG. 7 illustrates an optical system for an augmented reality display which can provide occlusion for real objects by arranging lenses in a 2-dimensional array in the unit optical system shown in FIG. 6.

The optical system for the augmented reality display according to an embodiment may include three off-axis lens arrays 110, 140, 160, two DCRAs 120, 150, and one LC mask 130 as shown in FIG. 7.

Respective lenses of the lens 1 array 110 focus incident light beams on holes of the DCRA1 120, respectively, and the DCRA 1 120 reflects the light beams focused on the respective holes, and the LC mask 130 positioned on a light emitting surface of the DCRA1 120 may pass or block the light beams emitted from the DCRA1 120.

Respective lenses of the lens 2 array 140 focus the light beams passing through and emitted from the LC mask 130 on the holes of the DCRA 2 150, and the DCRA 2 150 reflects the light beams focused on the holes, and respective lenses of the lens 3 array 160 positioned on a light emitting surface of the DCRA2 150 transform the light beams emitted from the DCRA2 150 into light beams parallel to the incident light beams entering the respective lenses of the lens 1 array 110.

Accordingly, in this system, light starting from one point of an object positioned at a long distance in the real world passes through the DCRA 1 20 by the respective lenses of the lens 1 array 110, and then, is imaged on the surface of the LC mask 130, and thereafter, passes through the lens 2 array 140, the DCRA 2 150, and the lens 3 array 150 and then is delivered to an observer along an original light path.

On the other hand, if the LC mask 130 blocks the imaged light, a corresponding point light source of the real object may be blocked. In this way, an optical system capable of providing real-world occlusion while having a thin thickness may be configured.

Up to now, the optical system for the augmented reality display has been described in detail with reference to preferred embodiments.

The above-described embodiments propose an optical system for an augmented reality display, which is capable of providing real-world occlusion in the unit of pixel while having a thin form factor by using off-axis lens arrays, a DCRA, and an LC mask.

The technical concept of the present disclosure may be applied to a computer-readable recording medium which records a computer program for performing the functions of the apparatus and the method according to the present embodiments. In addition, the technical idea according to various embodiments of the present disclosure may be implemented in the form of a computer readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the at without departing from the scope of the present disclosure claimed in claims, and also, changed embodiments should not be understood as being separate from the technical idea or prospect of the present disclosure.

What is claimed is:

1. An optical system comprising:
    a first dihedral corner reflector array (DCRA) including first holes and configured to reflect light beams focused on the first holes;
    a mask positioned on a light-exiting side of the first DCRA to pass or block the light beams exiting from the first DCRA; and
    a second dihedral corner reflector array (DCRA) including second holes and configured to reflect the light beams which are focused on the second holes after passing through the mask.

2. The optical system of claim 1, further comprising first lenses configured to focus incident light beams on the first holes of the first DCRA,
    wherein the first DCRA is configured to reflect the light beams focused on the first holes by the first lenses.

3. The optical system of claim 2, wherein the first lenses are positioned at positions where the incident light beams enter the first holes of the first DCRA in an off-axis orientation, respectively.

4. The optical system of claim 3, wherein the first lenses have centers positioned at a position apart from an optic axis of the incident light beams.

5. The optical system of claim 2, wherein the mask is configured to block light beams reflected from holes corresponding to positions where occlusion is provided for a real object, while passing light beams reflected from other holes corresponding to positions not providing the occlusion for the real object.

6. The optical system of claim 5, wherein the mask is a liquid crystal (LC) mask having pixels corresponding to the first holes of the first DCRA.

7. The optical system of claim 2, further comprising second lenses which have same center axes as the center axes of the first lenses and are configured to focus light beams emitted from the mask after passing therethrough on the second holes of the second DCRA,
   wherein the second DCRA is configured to reflect the light beams focused on the second holes by the second lenses.

8. The optical system of claim 7, further comprising third lenses which have same center axes as the center axes of the first lenses and the second lenses and are positioned on a light-exiting side of the second DCRA to transform the light beams emitted from the second DCRA into light beams parallel to the incident light beams entering the first lenses.

9. The optical system of claim 1, wherein $f_3 = f_1 f_2 / (f_1 - f_2)$,
   where $f_1$ is a focal distance of the first lenses, $f_2$ is a focal distance of the second lenses, and $f_3$ is a focal distance of the third lenses.

10. A real-world occlusion method of an optical system, the method comprising:
    reflecting, by a first dihedral corner reflector array (DCRA) including first holes, light beams focused on the first holes;
    passing or blocking, by a mask positioned on a light-exiting side of the first DCRA, the light beams exiting from the first DCRA; and
    reflecting, by a second dihedral corner reflector array (DCRA) including second holes, the light beams which are focused on the second holes after passing through the mask.

11. The method of claim 10, further comprising first lenses configured to focus incident light beams on the first holes of the first DCRA,
    wherein the first DCRA is configured to reflect the light beams focused on the first holes by the first lenses.

12. The method of claim 11, wherein the first lenses are positioned at positions where the incident light beams enter the first holes of the first DCRA in an off-axis orientation, respectively.

13. The method of claim 12, wherein the first lenses have centers positioned at a position apart from an optic axis of the incident light beams.

14. The method of claim 11, wherein the mask is configured to block light beams reflected from holes corresponding to positions where occlusion is provided for a real object, while passing light beams reflected from other holes corresponding to positions not providing the occlusion for the real object.

15. The method of claim 14, wherein the mask is a liquid crystal (LC) mask having pixels corresponding to the first holes of the first DCRA.

16. The method of claim 11, further comprising second lenses which have same center axes as the center axes of the first lenses and are configured to focus light beams emitted from the mask after passing therethrough on the second holes of the second DCRA, wherein the second DCRA is configured to reflect the light beams focused on the second holes by the second lenses.

17. The method of claim 16, further comprising third lenses which have same center axes as the center axes of the first lenses and the second lenses and are positioned on a light-exiting side of the second DCRA to transform the light beams emitted from the second DCRA into light beams parallel to the incident light beams entering the first lenses.

18. The method of claim 10, wherein $f_3 = f_1 f_2 / (f_1 - f_2)$,
    where $f_1$ is a focal distance of the first lenses, $f_2$ is a focal distance of the second lenses, and $f_3$ is a focal distance of the third lenses.

19. An optical system comprising:
    a first dihedral corner reflector array (DCRA) including first holes and configured to reflect light beams focused on the first holes;
    a mask positioned on a light-exiting side of the first DCRA to pass or block the light beams exiting from the first DCRA; and
    a second dihedral corner reflector array (DCRA) configured to reflect the light beams which are focused on the second holes after passing through the mask,
    wherein the mask is configured to block light beams reflected from holes corresponding to positions providing occlusion of a real object, while passing light beams reflected from another other holes corresponding to position not providing the occlusion of the real object.

20. The optical system of claim 19, further comprising first lenses configured to focus incident light beams on the first holes of the first DCRA, wherein the first DCRA is configured to reflect the light beams focused on the first holes by the first lenses.

* * * * *